(12) United States Patent
Koch et al.

(10) Patent No.: US 10,569,468 B2
(45) Date of Patent: Feb. 25, 2020

(54) APPARATUS FOR REMOVING AN INDUSTRIAL POWDER FROM AT LEAST ONE SHAPED BODY MANUFACTURED GENERATIVELY USING THE INDUSTRIAL POWDER

(71) Applicant: Ford Global Technologies, LLC, Dearborn, MI (US)

(72) Inventors: Raphael Koch, Odenthal (DE); Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 15/867,759

(22) Filed: Jan. 11, 2018

(65) Prior Publication Data

US 2018/0194065 A1 Jul. 12, 2018

(30) Foreign Application Priority Data

Jan. 11, 2017 (DE) .................. 10 2017 200 382

(51) Int. Cl.
| | | |
|---|---|---|
| *B08B 7/02* | (2006.01) | |
| *B33Y 30/00* | (2015.01) | |
| *B33Y 40/00* | (2015.01) | |
| *B29C 64/35* | (2017.01) | |
| *B08B 1/00* | (2006.01) | |
| *B08B 5/02* | (2006.01) | |

(52) U.S. Cl.
CPC .............. *B29C 64/35* (2017.08); *B08B 1/002* (2013.01); *B08B 5/02* (2013.01); *B08B 7/02* (2013.01); *B33Y 30/00* (2014.12); *B33Y 40/00* (2014.12)

(58) Field of Classification Search
CPC ........... B08B 7/02; B33Y 30/00; B33Y 40/00; B29C 64/35
See application file for complete search history.

(56) References Cited

U.S. PATENT DOCUMENTS

| | | | |
|---|---|---|---|
| 2002/0090410 A1 | 7/2002 | Tochimoto et al. | |
| 2006/0214335 A1* | 9/2006 | Cox ...................... | B01F 3/188 264/497 |
| 2012/0052145 A1* | 3/2012 | Chen ...................... | B08B 5/02 425/217 |

(Continued)

FOREIGN PATENT DOCUMENTS

DE 19937260 2/2001

*Primary Examiner* — Randall E Chin
(74) *Attorney, Agent, or Firm* — Burris Law, PLLC

(57) ABSTRACT

The present disclosure relates to an apparatus for removing industrial powder from a shaped body manufactured generatively using the industrial powder. The apparatus includes at least one container for holding the shaped body having a vertically adjustable construction platform, a vibrating screen, a tilting device for tilting the container, and at least one catching unit adjoining a transfer end of the vibrating screen for catching the shaped body. In one form, the vibrating screen, tilting device, and catching unit are arranged within a housing. In another form, the vibrating screen and catching unit are arranged within the housing and the tilting device is at least partially arranged in the housing. At least one opening in the housing is closed in an airtight manner by a glove such that a user can use the glove to grasp the shaped body caught by the catching unit.

20 Claims, 8 Drawing Sheets

(56) References Cited

U.S. PATENT DOCUMENTS

2013/0052291 A1 2/2013 Morikawa
2015/0266158 A1 9/2015 Summers et al.
2016/0200053 A1 7/2016 Chen et al.

* cited by examiner

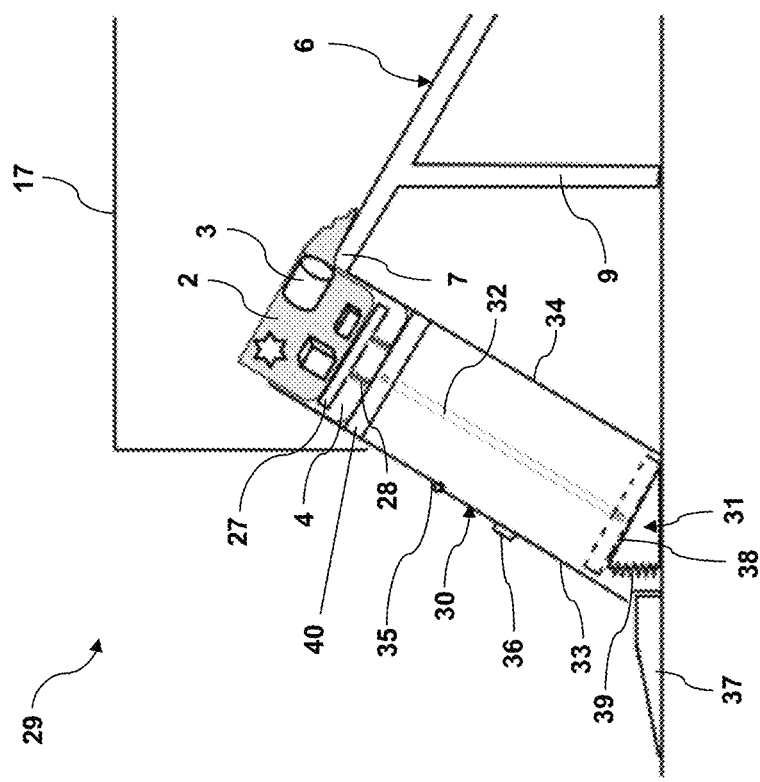

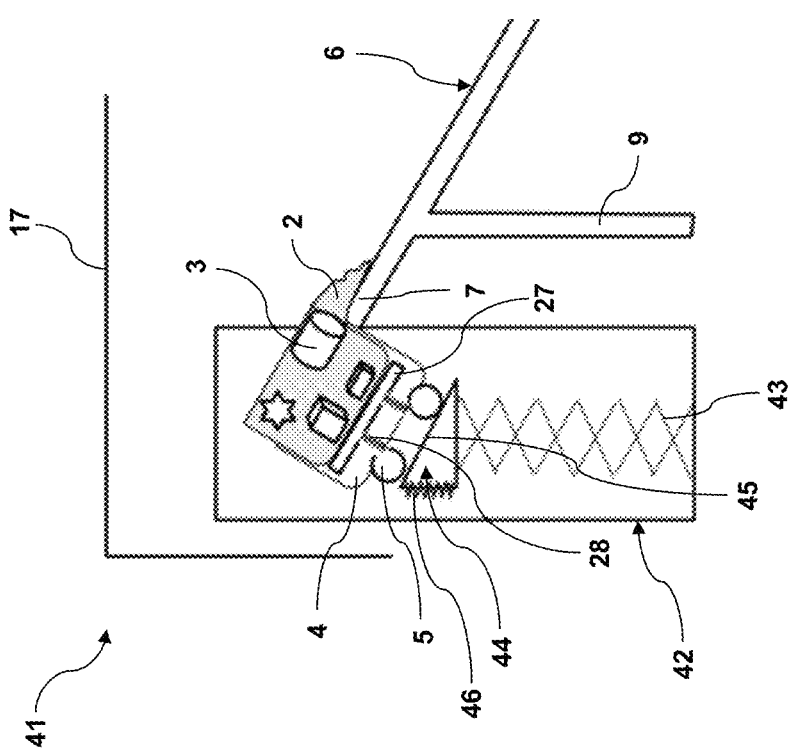

APPARATUS FOR REMOVING AN INDUSTRIAL POWDER FROM AT LEAST ONE SHAPED BODY MANUFACTURED GENERATIVELY USING THE INDUSTRIAL POWDER

CROSS-REFERENCE TO RELATED APPLICATIONS

This application claims priority to and the benefit of DE 102017200382.0 filed on Jan. 11, 2017. The disclosure of the above application is incorporated herein by reference.

FIELD

The present disclosure relates to an apparatus for removing an industrial powder from at least one shaped body manufactured generatively using the industrial powder.

BACKGROUND

The statements in this section merely provide background information related to the present disclosure and may not constitute prior art.

A shaped body can be produced quickly and economically by means of a generative manufacturing process, even when the shaping is very complex. This generative manufacture is also referred to as additive manufacture or as 3-D printing. By means of a generative manufacturing process, a shaped body can be produced in the form of a model, pattern, prototype, tool or end product, for example.

One specific generative manufacturing process is the powder bed process, in which generative manufacture of a shaped body takes place on the basis of a data model of the shaped body and using an industrial powder by means of a chemical and/or physical process. One specific powder bed process is selective laser sintering (SLS), in which a layer of a thermoplastic industrial powder is applied over the full surface of a vertically adjustable construction platform with the aid of a doctor or of a roll. The industrial powder used to form the layer can be made available by raising a powder platform or as a reservoir in a doctor. The industrial powder for the layer applied to the construction platform is selectively irradiated with a laser beam in accordance with a respective layer contour following from the data model of the shaped body. The energy which is supplied via the laser beam is absorbed by the industrial powder of the top layer and leads to local or selective sintering or fusion of particles of the industrial powder. The construction platform is then lowered slightly. After this, a new layer of industrial powder is applied over the full surface of the laser-treated first layer. Thus, the shaped body is manufactured layer by layer in a vertical direction. The correspondingly generatively manufactured shaped body is embedded in a bed of industrial powder situated on the construction platform.

One issue is that a shaped body conventionally has to be separated manually from the bed of industrial powder after the conclusion of the generative manufacture thereof. This conventionally takes place using suction means or cleaning brushes in an unenclosed environment, for example, and this often leads to contamination of the environment by spilled industrial powder and dust. Since most of the work is done by hand here, separating the shaped body from the industrial powder takes a lot of time and effort.

In order to automate the removal of an industrial powder from shaped bodies manufactured generatively using the industrial powder, U.S. Patent Publication No. 2015/0266158 A1 proposes an apparatus of the type in question. However, it is also not possible with this apparatus to avoid the industrial powder getting into the environment of the apparatus and thereby contaminating the environment.

U.S. Patent Publication No. 2013/0052291 A1 also discloses an apparatus for removing an industrial powder from shaped bodies manufactured generatively using the industrial powder. The apparatus comprises a housing, which is formed by a partition wall and a cover having a door. Via the door, a container can be inserted into an opening in the partition wall. To remove the industrial powder from the shaped bodies, air nozzles arranged within the housing and a suction device arranged within the housing are switched on, while a base plate of the container is moved upward in stages in order to empty the container in stages.

U.S. Patent Publication No. 2002/0090410 A1 likewise discloses an apparatus for removing an industrial powder from a shaped body manufactured generatively using the industrial powder. For this purpose, a construction platform, on which the generatively manufactured shaped body embedded in a powder bed is situated, is lowered as far as a blower and suction unit after completion of generative manufacture. The industrial powder is removed from the shaped body by activation of the blower and suction unit.

SUMMARY

The present disclosure provides an apparatus in such a way that contamination of the environment with industrial powder and contact between persons and the industrial powder are reliably avoided.

According to the present disclosure, an apparatus is provided having the features in claim 1, wherein the apparatus has a housing, which can be closed in an airtight manner, which is of at least partially transparent design, into which the container can be introduced and in which the vibrating screen and the catching unit are arranged and in which the tilting device is at least partially arranged, and at least one opening, which is formed in the housing and is closed in an airtight manner by a glove, wherein the opening and the glove are designed and arranged in such a way that a person can use the glove to grasp the shaped body caught by the catching unit.

It should be noted that the features and measures presented individually in the following description can be combined in any technically feasible way and give rise to further forms of the present disclosure. The description additionally characterizes and specifies the present disclosure, especially in conjunction with the figures.

By virtue of the arrangement of the container, the vibrating screen and the catching unit in the airtightly closed housing and the arrangement of the tilting device at least partially in said housing, the removal of the industrial powder from the shaped body manufactured generatively using the industrial powder can be performed without the industrial powder contaminating the environment of the apparatus and coming into contact with persons during this process. After at least partial removal of the industrial powder from the shaped body by the vibrating screen, a person can grasp and handle the shaped body by the glove without coming into direct skin contact with the shaped body and any industrial powder which may still be on said body. To enable the shaped body to be grasped and handled, the housing is of partially or completely transparent design, allowing a person to see into the housing. The housing can have at least one inspection window, for example, via which at least the catching unit can be seen. The housing can be of such transparent design that a person can observe and monitor the removal of the industrial powder from the shaped body by the vibrating screen.

The housing can have at least one charging opening, which can be closed in an airtight manner by a door or the like and via which the container can be introduced into the housing and removed therefrom. The size, i.e. dimensions, of the charging opening are such that a person can arrange the container on the tilting device.

In one form, the glove is of flexible and airtight or liquid-tight design. The glove can be produced at least partially from an elastomer. The glove can be designed in such a way that a person can insert both a hand and a lower arm or even his or her arm into the glove. For this purpose, a correspondingly large sleeve can be provided, to which the glove can be joined, wherein the sleeve is expediently made from a material of the same type as the glove. It is expedient if the glove and the sleeve are of one-piece design, but they can also be of two-piece design and connected by a connecting seam.

The container for holding the shaped body embedded in the industrial powder is a container, for example, in which the shaped body is generatively produced and which can be inserted into an apparatus for the generative manufacture of shaped bodies. This apparatus is designed for carrying out a powder bed process in the form of selective laser sintering (SLS). The container can be designed in accordance with the interchangeable container according to DE 198 46 478 A1, for example. In particular, the container can have a vertically adjustable base which forms a construction platform for the shaped body. The container can also be designed in such a way that it can hold two or more shaped bodies of identical or different design embedded in the industrial powder. Vertical adjustment of the construction platform of the container enables the industrial powder and the shaped body to be forced out of the container.

The vibrating screen arranged in a sloping manner is connected mechanically to a driving device, which drives the vibrating screen or imparts vibrations thereto, according to one form. By means of this movement of the vibrating screen, impact forces are transmitted to the shaped body, thereby improving the removal of the industrial powder from the shaped body and simultaneously assisting movement of the shaped body along the vibrating screen to the catching unit. The vibrating screen can be designed at least partially as a grid or provided with a perforation. In particular, a multiplicity of apertures, the dimensioning of which is chosen so that the industrial powder, but not the shaped body, can pass through the apertures, is formed in the vibrating screen. Moreover, the apertures are designed in such a way that the shaped body cannot enter the apertures. By this means, it is possible to inhibit the shaped body from hooking into the vibrating screen or catching on the vibrating screen, thus avoiding destruction thereof. Guide walls can be formed laterally on the vibrating screen to inhibit industrial powder detached from the shaped body from flowing off sideways from the vibrating screen or to inhibit the shaped body from falling off sideways. The vibrating screen can be produced at least partially from metal, a plastic or a composite material. Since the feed end of the vibrating screen is arranged at a geodetically higher level than the transfer end of the vibrating screen, the shaped body can slide along the vibrating screen by virtue of the gravitational force acting on it to enable it to move from the feed end to the transfer end without further mechanical means. The apparatus according to the present disclosure can also have two or more vibrating screens arranged in parallel or in series.

The tilting device for tilting the container can have at least one holding unit for holding the container introduced into the housing and at least one driving device for moving or driving the holding unit. By the driving device, the tilting movement of the container can be brought about. And in one form, the driving device is electrically controllable. Moreover, it is possible for the container to be raised by tilting device before or during the tilting movement.

The catching unit, which adjoins the transfer end of the vibrating screen, for catching the shaped body sliding off the vibrating screen can be designed as a table, plate or trough, for example. In one form, the catching unit adjoins the transfer end of the vibrating screen in such a way that the shaped body passes from the transfer end of the vibrating screen into or onto the catching unit without further mechanical means.

It is thus possible, by the apparatus according to the present disclosure, to remove the industrial powder from shaped bodies in an airtightly closed housing, wherein the removal of the industrial powder from the shaped body can be accomplished in an automated manner by the vibrating screen and, if desired, then manually by the glove. The removal of the industrial powder from the shaped bodies can therefore be carried out quickly without the industrial powder coming into contact with a person. Moreover, the industrial powder is not lost in the environment but can be caught in the housing and reused, this being associated with a reduction in costs, especially in the course of mass production of shaped bodies.

According to an advantageous form, the apparatus comprises at least one further opening, which is formed in the housing and is closed in an airtight manner by a further glove, and at least one cleaning device, which is arranged in the housing and can be guided by hand, for cleaning the shaped body, wherein the further opening and the further glove are designed and arranged in such a way that a person can use the further glove to grasp the cleaning device. The person can thus grasp the shaped body by one glove and grasp and guide the cleaning devices by the further glove to enable further industrial powder to be removed from the shaped body. The cleaning device can be a mechanical cleaning device. The apparatus can also have two or more different cleaning devices. The further glove is of flexible and airtight or liquid-tight design. The further glove can be produced at least partially from an elastomer. The further glove can be designed in such a way that a person can insert both a hand and a forearm or arm into the further glove, as before.

Another advantageous form envisages that the cleaning device is a scrubbing brush or a cleaning brush or an air gun. The air gun is connected to a compressed air supply, which can form part of the apparatus or can be arranged separately, by a flexible line, e.g. a hose.

According to another advantageous form, the apparatus comprises at least one catching unit, which is arranged underneath the vibrating screen, for catching the industrial powder falling through the vibrating screen. By the catching unit, the industrial powder falling through the vibrating screen can be caught, thus allowing the industrial powder caught to be fed for reuse. The catching unit can have at least one catching plate, which is arranged in a sloping manner for example, and/or at least one catching channel and/or at least one catching trough.

According to another advantageous form, the catching unit for catching the shaped body sliding off the vibrating screen has at least one working plate of at least partially screen-type design, wherein at least one catching unit for catching the industrial powder falling through the working plate is arranged underneath the working plate. It is thereby also possible to catch the industrial powder falling through the working plate and feed it for reuse. The catching unit for catching the industrial powder falling through the working plate can have at least one catching plate, which is arranged in a sloping manner for example, and/or at least one catching channel and/or at least one catching trough. The catching unit for catching the industrial powder falling through the working plate can form a common catching unit together with the catching unit for catching the industrial powder falling through the vibrating screen, said catching unit extending both underneath the vibrating screen and underneath the working plate. The working plate can be designed partially or completely as a grid or provided with a perforation. In particular, a multiplicity of apertures, the dimensioning of which is chosen so that the industrial powder, but not the shaped body, can pass through the apertures, can be formed in the working plate. Moreover, in one form, the apertures in the working plate are designed in such a way that the shaped body cannot enter the apertures. By this means, it is possible to inhibit the shaped body from hooking into the working plate or catching on the working plate. The working plate can be produced at least partially from metal, a plastic or a composite material.

In another advantageous form, the apparatus comprises at least one holding container, which is arranged in the housing, for holding the industrial powder caught by the catching unit for catching the industrial powder falling through the vibrating screen and/or by the catching unit for catching the industrial powder falling through the working plate. In this case, the catching unit for catching the industrial powder falling through the vibrating screen and the catching unit for catching the industrial powder falling through the working plate can form a catching hopper, via which the industrial powder caught enters the holding container. The holding container can be removed from the housing for reuse of the industrial powder contained therein.

It is furthermore advantageous if the apparatus has at least one collecting container, which is arranged in the housing, for receiving the cleaned shaped body, wherein the collecting container is arranged in the housing in such a way that the person can deposit the shaped body in the collecting container using the glove. The collecting container can be removed from the housing to remove the cleaned shaped body or bodies. The collecting container can be of trough-type design, for example.

According to another advantageous form, the tilting device comprises at least one tilting mechanism for tilting the container and at least one lifting mechanism, which is arranged in a sloping manner, for raising the tilted container in a linear manner. According to this, the container is first of all tilted into a particular tilted position and is then raised in a linear manner along a sloping path in this tilted position until an opening of the container is at a geodetically higher level than the feed end of the vibrating screen. During the raising process, the container is guided in such a way in a tubular guide unit that an industrial powder emerging from the opening of the container cannot get between the container and the guide unit or can do so only very slightly. The linear path of movement of the container can be perpendicular to the vibrating screen, for example. The tilting mechanism and the lifting mechanism can each have an electrically controllable drive in order to bring about tilting or raising of the container.

According to another advantageous form, the tilting device comprises at least one lifting mechanism for raising the container in a vertical and linear manner and at least one tilting mechanism for tilting the container raised in a vertical and linear manner. According to this, the container introduced into the housing is first of all raised to a particular height until the opening of the container is at a geodetically higher level than the feed end of the vibrating screen and is then tilted. The tilting mechanism and the lifting mechanism can each have an electrically controllable drive in order to bring about tilting or raising of the container.

It is furthermore deemed advantageous if the tilting device has at least one lifting mechanism for raising the container, by means of which the container can be raised along a curved path. By means of a movement of the container along the curved path, the container is raised until the opening of the container is at a geodetically higher level than the feed end of the vibrating screen and is simultaneously tilted. During the movement on the curved path, the container is guided in such a way in a tubular guide unit that an industrial powder emerging from the opening of the container cannot get between the container and the guide unit or can do so only very slightly. The lifting mechanism can have an electrically controllable drive in order to bring about raising of the container.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 shows a schematic illustration of one section of another illustrative form of an apparatus according to the present disclosure; and FIG. 8 shows a schematic illustration of one section of another illustrative form of an apparatus according to the present disclosure.

Figure 1:
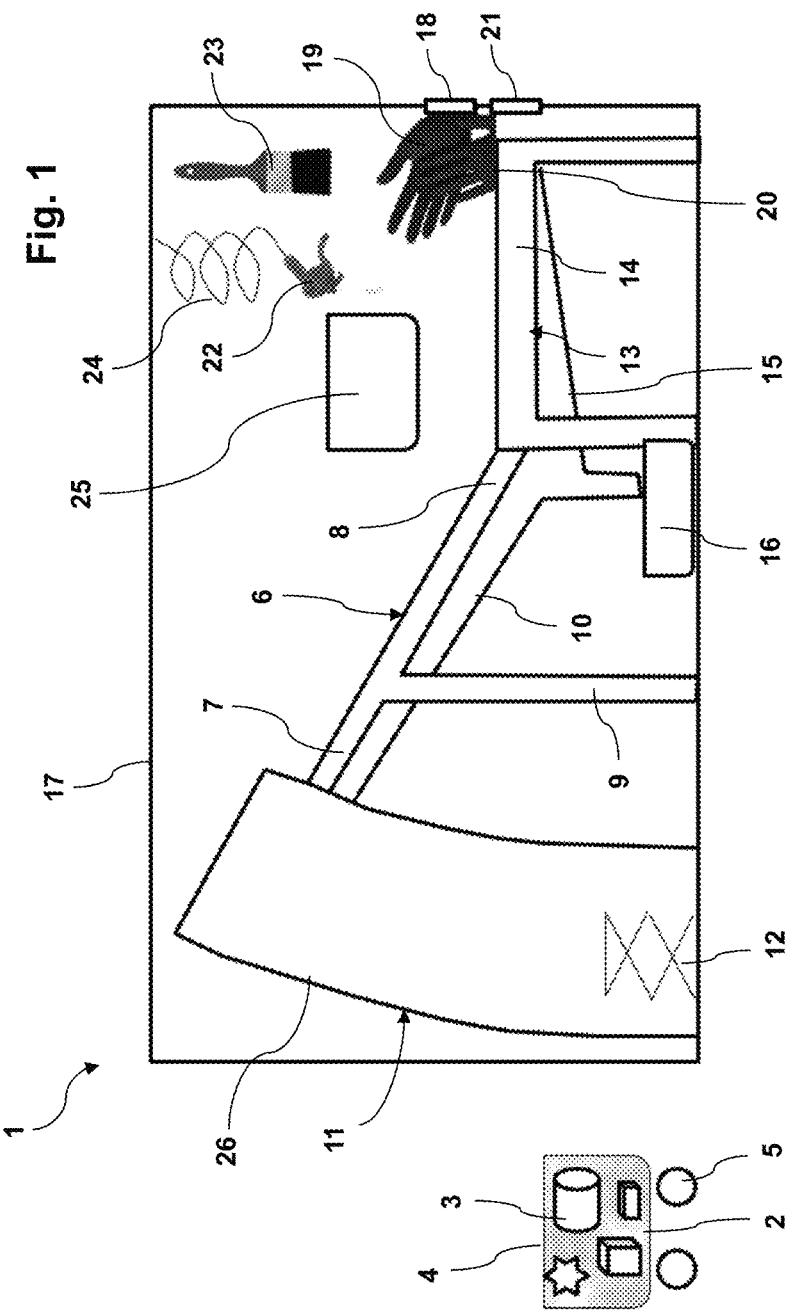
FIG. 1 shows a schematic illustration of an illustrative form of an apparatus according to the present disclosure in an initial state.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic illustration of an illustrative form of an apparatus 1 according to the present disclosure for removing an industrial powder 2 from shaped bodies 3 manufactured generatively using the industrial powder 2, in an initial state.

The apparatus 1 has a container 4 for holding the shaped bodies 3 embedded in the industrial powder 2. The shaped bodies 3 are of various designs and are produced by a powder bed process, in particular by selective laser sintering (SLS). The container 4 is provided with wheels 5. As an alternative, the container 4 can be placed on a trolley (not shown) and, with the latter, can form a unit that has the wheels 5.

The apparatus 1 furthermore has a vibrating screen 6 arranged in a sloping manner and having a feed end 7 and a transfer end 8 arranged at a geodetically lower level than the feed end 7. The vibrating screen 6 is mechanically connected to a schematically indicated driving device 9, by means of which the vibrating screen 6 can be driven or by means of which the vibrating screen 6 is shaken. Moreover, the apparatus 1 comprises a powder catching unit 10, which is arranged underneath the vibrating screen 6, for catching the industrial powder 2 falling through the vibrating screen 6. The powder catching unit 10 is designed as a plate arranged in a sloping manner.

Figure 3:
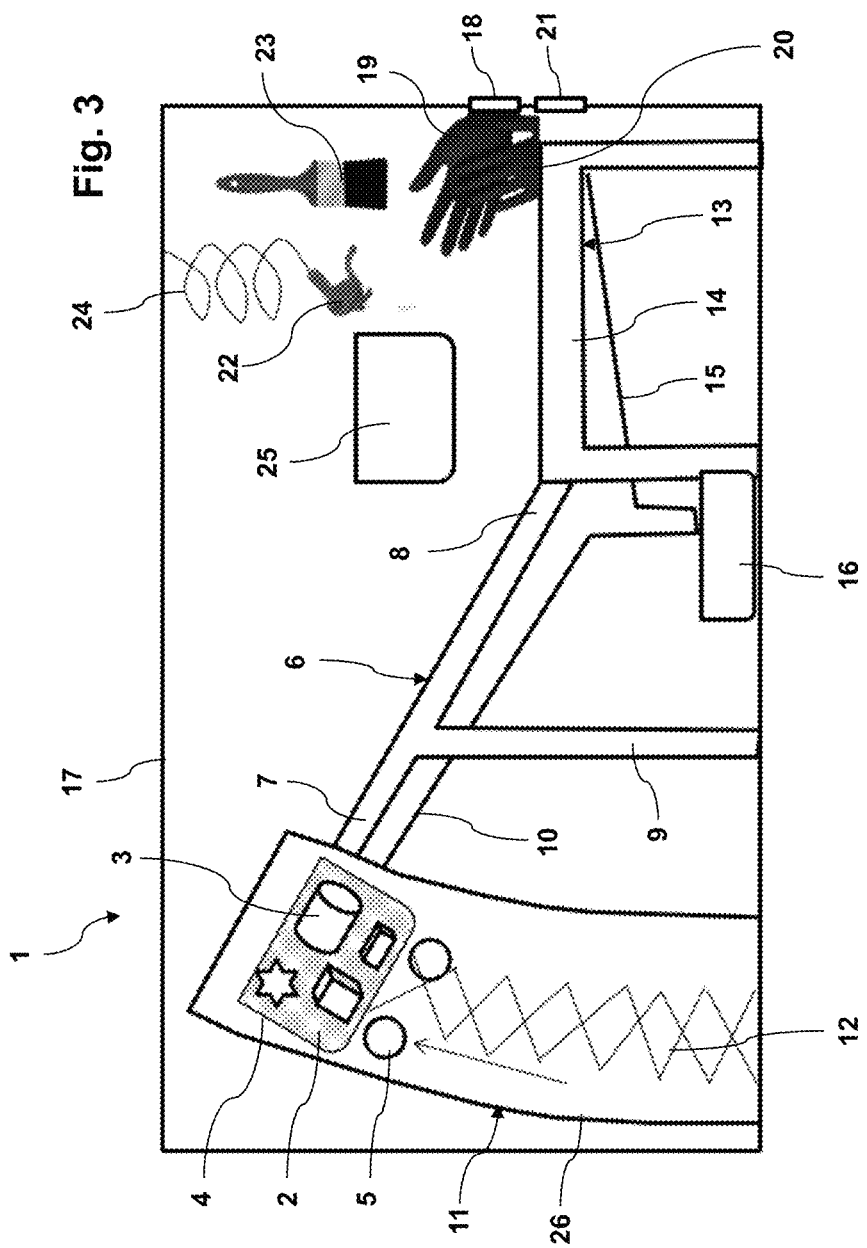
FIG. 3 shows a schematic illustration of the apparatus shown in FIG. 2 with the container raised.
Figure 4:
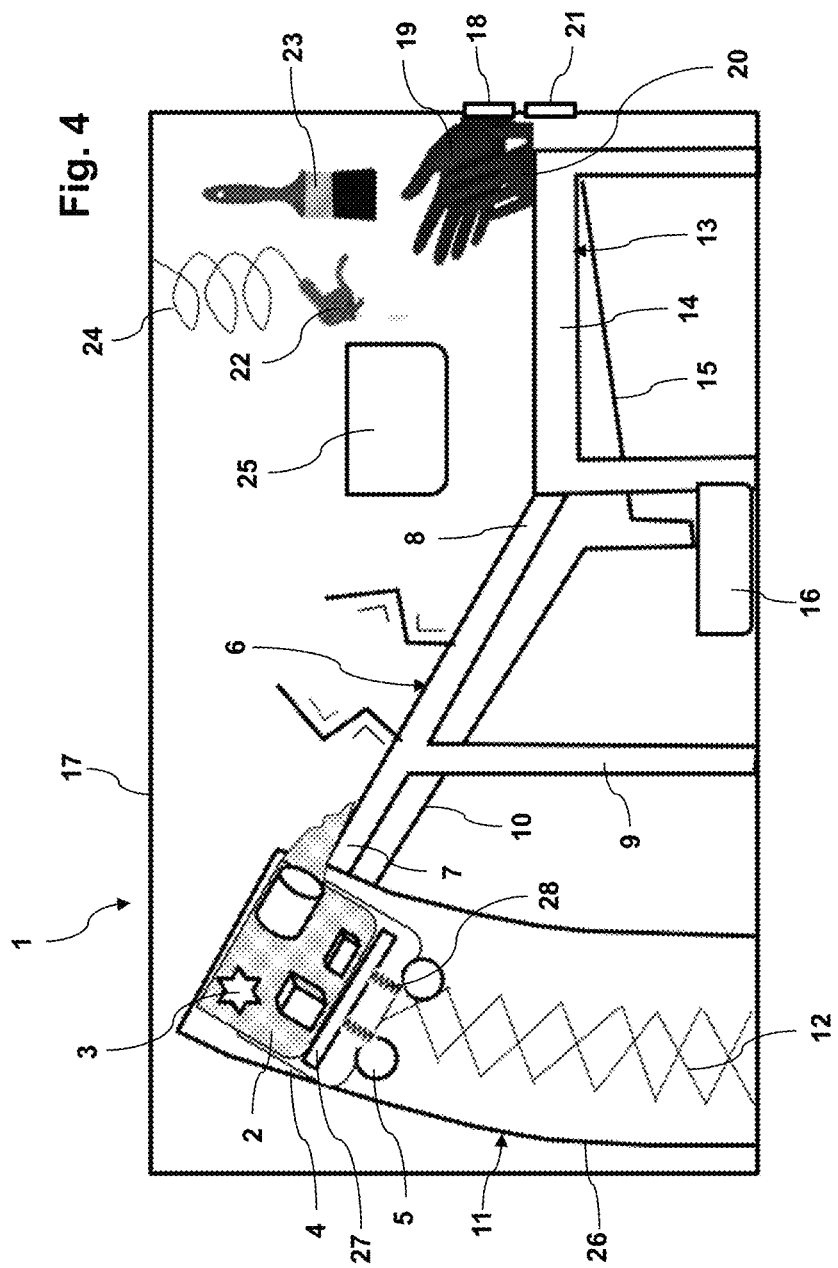
FIG. 4 shows a schematic illustration of the apparatus shown in FIG. 3 at a beginning of an automated removal process.
Figure 5:
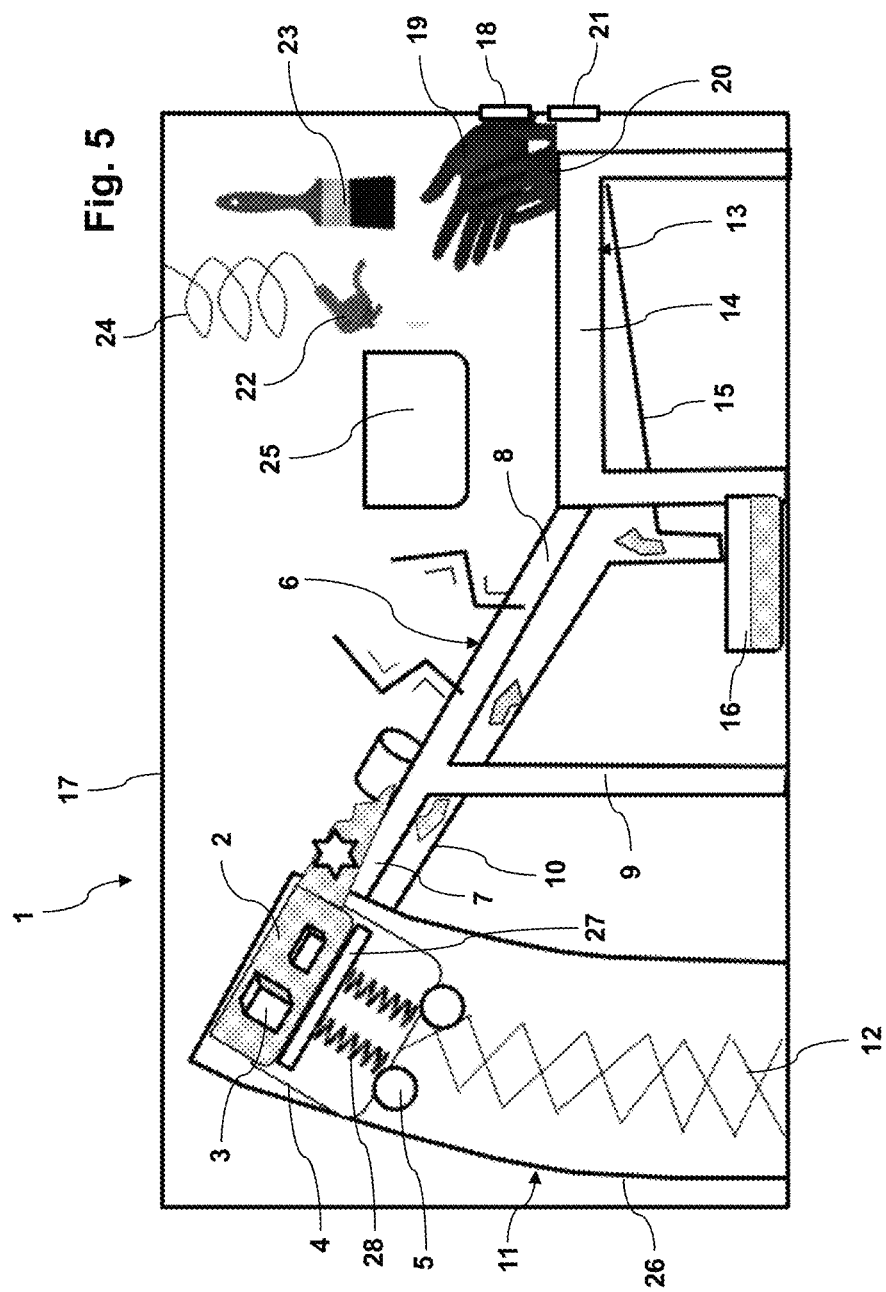
FIG. 5 shows a schematic illustration of the apparatus shown in FIG. 4 during the automated removal process.

Moreover, the apparatus 1 has a tilting device 11 for tilting the container 4, allowing the shaped bodies 3 and the industrial powder 2 to be tipped onto the feed end 7 of the vibrating screen 6, as shown in FIGS. 4 and 5. The tilting device 11 comprises a lifting mechanism 12 for raising the container 4, by means of which the container 4 can be raised along a curved path, as shown in FIGS. 3 to 6. The tilting device 11 comprises a curved guide unit 26, into which the container 4 can be introduced and which guides the container 4 as it is raised.

Figure 6:
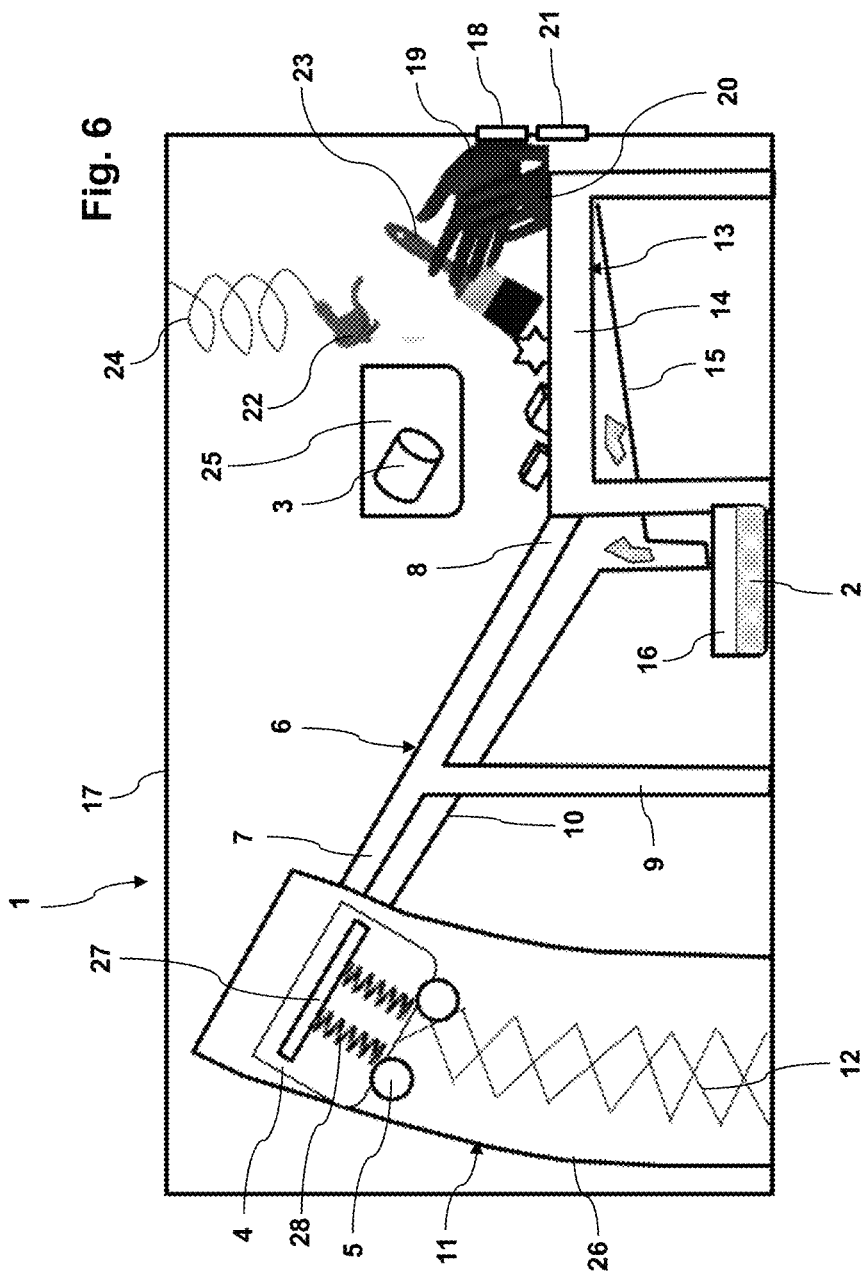
FIG. 6 shows a schematic illustration of the apparatus shown in FIG. 5 after the automated removal process.

Furthermore, the apparatus 1 has a catching unit 13, which adjoins the transfer end 8 of the vibrating screen 6, for catching the shaped bodies 3 sliding off the vibrating screen 6, as shown in FIG. 6. The catching unit 13 for catching the shaped bodies 3 sliding off the vibrating screen 6 comprises a working plate 14 of at least partially screen-type design, wherein the catching unit 13 is designed as a table. A catching unit 15 for catching the industrial powder 2 falling through the working plate 14 is arranged underneath the working plate 14. The catching unit 15 is designed as a plate arranged in a sloping manner.

The apparatus 1 furthermore has a holding container 16 for holding the industrial powder 2 caught by the powder catching unit 10 for catching the industrial powder 2 falling through the vibrating screen 6 and by the catching unit 15 for catching the industrial powder 2 falling through the working plate 14.

Furthermore, the apparatus 1 comprises a housing 17, which can be closed in an airtight manner, which is of at least partially transparent design, into which the container 4 can be introduced and in which the vibrating screen 6, the tilting device 11, the catching unit 13 and the holding container 16 are arranged. An opening 18, which is closed in an airtight manner by a glove 19, is formed in the housing 17. The opening 18 and the glove 19 are designed and arranged in such a way that a person use the glove 19 to grasp and handle a shaped body 3 caught by the catching unit 13.

Moreover, the apparatus 1 has at least one further opening 21, which is formed in the housing 17 and is closed in an airtight manner by a further glove 20, and two cleaning devices 22 and 23, which are arranged in the housing and can be guided by hand, for cleaning the shaped bodies 3. The further opening 21 and the further glove 20 are designed and arranged in such a way that a person can use the further glove 20 to grasp and handle the respective cleaning device 22 or 23. In one form, the cleaning device 22 is an air gun, which is supplied with compressed air via a line 24. In another form, the cleaning device 23 is a cleaning brush.

The gloves are supposed to be illustrated only in a schematic way and can be formed in such a way that a user can insert their arm. Thus, possible sleeves are not illustrated.

The apparatus 1 furthermore comprises a collecting container 25, which is arranged in the housing 17, for receiving the cleaned shaped bodies 3, wherein the collecting container 25 is arranged in the housing 17 in such a way that the person can deposit the shaped bodies 3 in the collecting container 25 using the glove 19 and/or 20.

Figure 2:
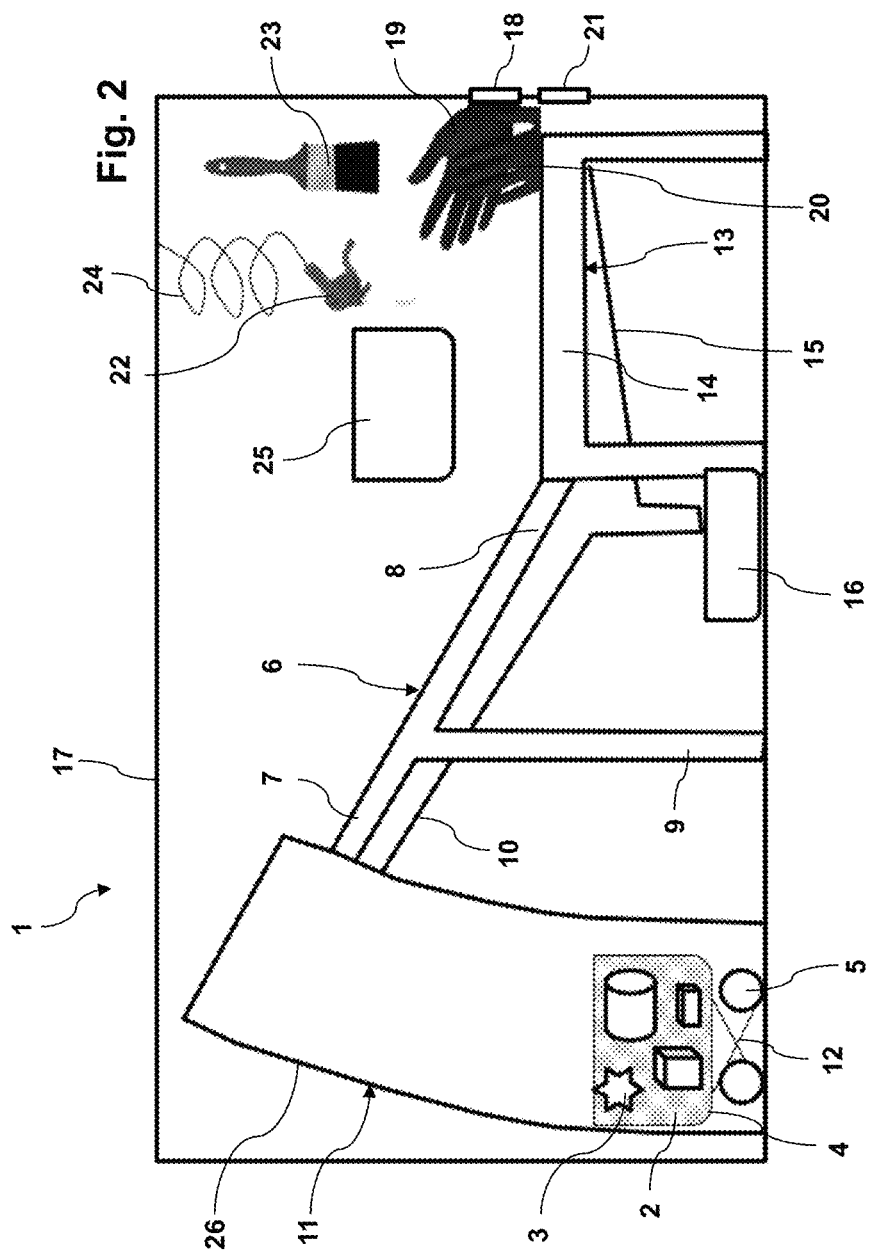
FIG. 2 shows a schematic illustration of the apparatus shown in FIG. 1 with a container introduced into a housing.

FIG. 2 shows a schematic illustration of the apparatus 1 shown in FIG. 1 with a container 4 introduced into the housing 17. For this purpose, the housing 17 can have a charging opening (not shown), which can be closed in an airtight manner by means of a door (not shown) or the like. In FIG. 2, the container 4 is situated within the guide unit 26 and on the lifting mechanism 12.

FIG. 3 shows a schematic illustration of the apparatus 1 shown in FIG. 2 with the container 4 raised. By virtue of the curvature of the guide unit 26 or tilting device 11, the container 4 is forcibly tilted as it is raised.

FIG. 4 shows a schematic illustration of the apparatus 1 shown in FIG. 3 at the beginning of an automated removal process. For this purpose, the container 4 is raised by the tilting device 11 until it is arranged partially at a geodetically higher level than the feed end 7 of the vibrating screen 6. At the same time, the container 4 has been tilted to such an extent that the industrial powder 2 and the shaped bodies 3 can be tipped slowly onto the feed end 7 of the vibrating screen 6. For this purpose, the container 4, in one form, comprises a vertically adjustable construction platform 27 and a drive unit 28, which drives said platform. By the vertical adjustment of the construction platform 27, the industrial powder 2 and the shaped bodies 3 are forced slowly out of the container 4 and thereby tipped onto the feed end 7. No later than when the position of the container 4 shown in FIG. 4 is reached, the driving device 9 is activated, with the result that the vibrating screen 6 performs the vibrating movements thereof.

FIG. 5 shows a schematic illustration of the apparatus 1 shown in FIG. 4 during the automated removal process. The industrial powder 2 and the shaped bodies 3 move along the vibrating screen 6 in the direction of the transfer end 8 thereof by virtue of the gravitational force acting on each of them and of the vibrating movements of the vibrating screen 6. During this process, as is shown, the industrial powder 2 falls through the apertures (not shown) in the vibrating screen 6 and is then caught by the powder catching unit 10 and guided into the holding container 16 by virtue of the gravitational force acting on the industrial powder 2 and the slope of the powder catching unit 10.

FIG. 6 shows a schematic illustration of the apparatus 1 shown in FIG. 5 after the automated removal process. There are three shaped bodies 3 on the working plate 14 of the catching unit 13, whereas one shaped body 3 has already been grasped by the glove 19 and/or 20 and deposited in the collecting container 25. The shaped bodies 3 situated on the working plate 14 can be grasped individually by the glove 19 and/or 20. The cleaning device 22 and/or 23 can be grasped by the other glove 20 or 19. Thus, the industrial powder 2 can be removed manually from the grasped shaped body 3 before said body is deposited in the collecting container 25. In FIG. 6, glove 19 is used to grasp cleaning device 23. The container 4 has been completely emptied and the driving device 9 has been switched off.

FIG. 7 shows a schematic illustration of one section of another illustrative form of an apparatus 29 according to the present disclosure for removing an industrial powder 2 from shaped bodies 3 manufactured generatively using the industrial powder 2.

The apparatus 29 differs from the illustrative form shown in FIGS. 1 to 6 in that a tilting device 30 has a tilting mechanism 31 for tilting the container 4 and a lifting mechanism 32, which is arranged in a sloping manner, for raising the tilted container 4 in a linear manner. Moreover, the tilting mechanism 30 is arranged partially within and partially outside the housing 17 and has a charging opening (not shown specifically), which is closed in an airtight manner by a flap 33 and via which the container 4 can be introduced into the tilting device 30 or a linear guide unit 34 thereof. The flap 33 is connected movably to the guide unit 34 by at least one joint 35 and has a handle 36. The apparatus 29 comprises a ramp 37, via which the container 4 can be driven into the tilting device 30 and arranged on the tilting mechanism 31 when the flap 33 is open. The tilting mechanism 31 comprises a tiltable plate 38 and a drive unit 39, which drives the plate 38. The lifting mechanism 32 comprises a vertically adjustable platform 40, which is shown in the upper position thereof in FIG. 7. A lower position of the platform 40 is indicated by a dashed line. To avoid repetition, attention is drawn in other respects to the above description given in relation to FIGS. 1 to 6.

FIG. 8 shows a schematic illustration of one section of another illustrative form of an apparatus 41 according to the present disclosure for removing an industrial powder 2 from shaped bodies 3 manufactured generatively using the industrial powder 2.

Apparatus 41 differs from the illustrative form shown in FIGS. 1 to 6 in that the tilting device 42, which is arranged completely in the housing 17, has a lifting mechanism 43 for raising the container 4 in a vertical and linear manner and a tilting mechanism 44 for tilting the container 4 which has been raised in a vertical and linear manner. The tilting mechanism 44 comprises a tiltable plate 45 and a drive unit 46, which drives the plate 45. To avoid repetition, attention is drawn in other respects to the above description given in relation to FIGS. 1 to 6.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for removing industrial powder from at least one shaped body manufactured generatively using the industrial powder, the apparatus comprising:
    at least one container for holding the at least one shaped body embedded in the industrial powder, wherein the at least one container has a vertically adjustable construction platform;
    at least one vibrating screen arranged in a sloping manner and having a feed end and a transfer end arranged at a geodetically lower level than the feed end;
    at least one tilting device for tilting the at least one container;
    at least one catching unit for catching the at least one shaped body sliding off the vibrating screen, the at least one catching unit adjoining the transfer end of the vibrating screen; and
    a housing adapted to be closed in an airtight manner and is at least partially transparent,
    wherein the container is introduced into the housing,
    wherein the at least one vibrating screen and the at least one tilting device are arranged within the housing, and the at least one catching unit is at least partially arranged within the housing, and
    wherein the housing includes at least one opening closed in an airtight manner by at least one glove, wherein the at least one opening and the at least one glove is configured for a user to grasp the at least one shaped body caught by the catching unit.

2. The apparatus as claimed in claim 1, wherein the housing includes two openings, each opening is closed in an airtight manner by a glove configured for the user to grasp the at least one shaped body and at least one cleaning device arranged in the housing for cleaning the at least one shaped body.

3. The apparatus as claimed in claim 2, wherein the at least one cleaning device is a scrubbing brush, a cleaning brush, or an air gun.

4. The apparatus as claimed in claim 1 further comprising at least one powder catching unit.

5. The apparatus as claimed in claim 4, wherein the at least one powder catching unit is arranged underneath the at least one vibrating screen for catching the industrial powder falling through the at least one vibrating screen.

6. The apparatus as claimed in claim 4, wherein the catching unit for catching the shaped body sliding off the vibrating screen has at least one working plate, wherein at least one powder catching unit for catching the industrial powder falling through the working plate is arranged underneath the working plate.

7. The apparatus as claimed in claim 6, wherein the at least one working plate is at least partially a screen design.

8. The apparatus as claimed in claim 1 further comprising at least one holding container arranged in the housing and adapted for holding the industrial powder caught by at least one of the catching unit for catching the industrial powder falling through the vibrating screen and the catching unit for catching the industrial powder falling through a working plate.

9. The apparatus as claimed in claim 1 further comprising at least one collecting container arranged in the housing and adapted for receiving at least one clean shaped body, wherein the collecting container is arranged in the housing such that the user can deposit the at least one shaped body in the collecting container using the at least one glove.

10. The apparatus as claimed in claim 1, wherein the at least one tilting device includes at least one tilting mechanism for tilting the at least one container and at least one lifting mechanism arranged in a sloping manner for raising the tilted container in a linear manner.

11. The apparatus as claimed in claim 1, wherein the at least one tilting device includes at least one lifting mechanism for raising the container in a vertical and linear manner and at least one tilting mechanism for tilting the container raised in a vertical and linear manner.

12. The apparatus as claimed in claim 1, wherein the at least one tilting device includes at least one lifting mechanism for raising the container along a curved path.

13. An apparatus for removing industrial powder from at least one shaped body manufactured generatively using the industrial powder, the apparatus comprising:
- a housing adapted to be closed in an airtight manner, the housing comprising:
  - at least one sloping screen including a feed end and a transfer end;
  - a catching unit adjoining the transfer end of the at least one sloping screen, the catching unit comprising a working plate; and
  - at least one powder catching unit disposed under at least one of the at least one sloping screen and the working plate of the catching unit; and
- a tilting device for receiving at least one container holding the at least one shaped body, wherein the tilting device includes at least one lifting mechanism for raising the at least one container and at least one tilting mechanism for tilting the at least one container.

14. The apparatus as claimed in claim 13, wherein the tilting device is disposed within the housing and the at least one container is raised by the lifting mechanism on a curved path defined by the tilting device.

15. The apparatus as claimed in claim 13, wherein the tilting device is disposed within the housing and the at least one container is raised by the lifting mechanism on a vertical path defined by the tilting device.

16. The apparatus as claimed in claim 13, wherein the tilting device is disposed partially within the housing and partially outside the housing.

17. The apparatus as claimed in claim 16, wherein the lifting mechanism of the tilting device comprises a vertically adjustable platform and the tilting mechanism of the tilting device comprises a tiltable plate and a drive unit that drives the tiltable plate.

18. The apparatus as claimed in claim 13, wherein the housing further comprises at least one opening, each opening closed in an airtight manner by a glove.

19. The apparatus as claimed in claim 13 further comprising at least one cleaning device, wherein the at least one cleaning device is at least one of a scrubbing brush, a cleaning brush, and an air gun.

20. The apparatus as claimed in claim 13 further comprising:
- a holding container disposed within the housing, wherein the industrial powder caught by the at least one industrial powder catching units is held; and
- a collection container for depositing the at least one shaped body after the industrial powder is removed.

* * * * *